Sept. 11, 1928.
G. ZITZMANN
ENGINE TESTING GAUGE
Filed June 3, 1921  2 Sheets-Sheet 1
1,683,710
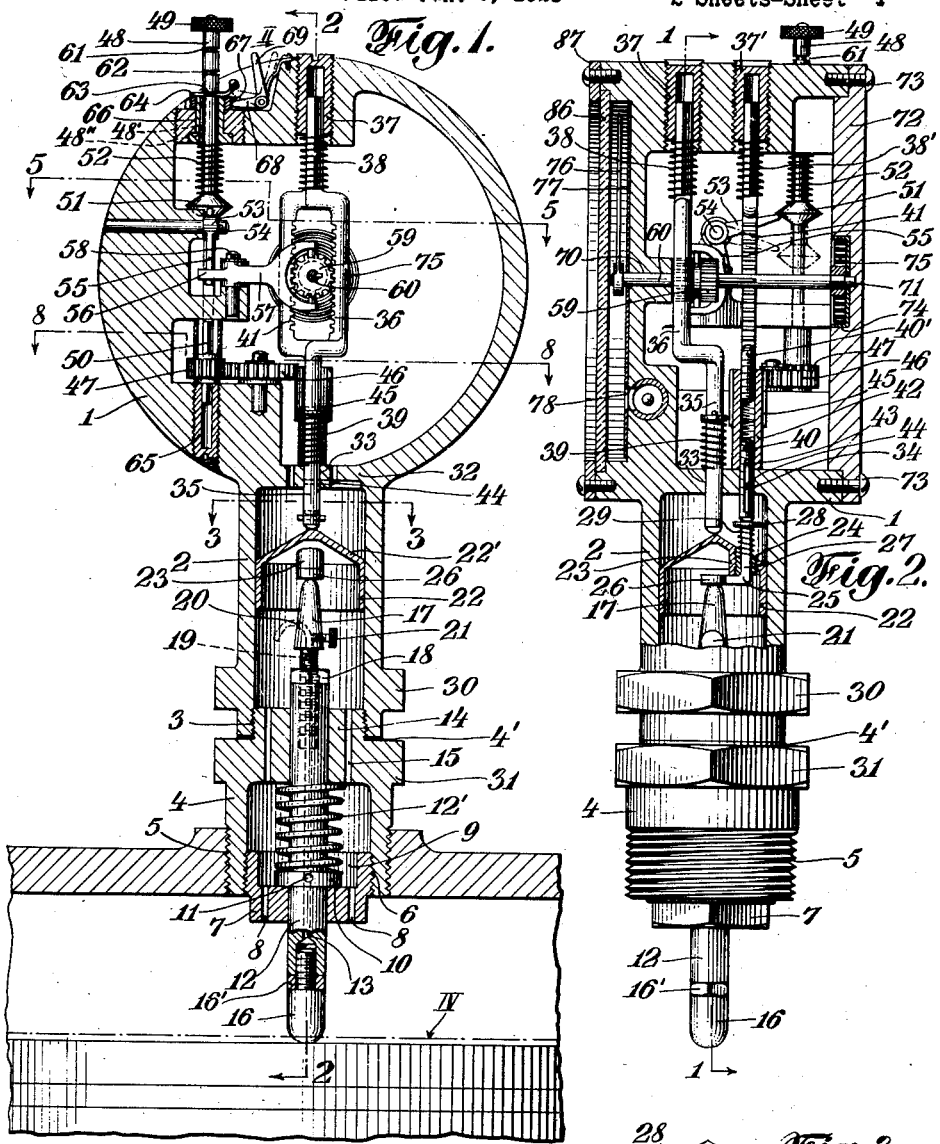
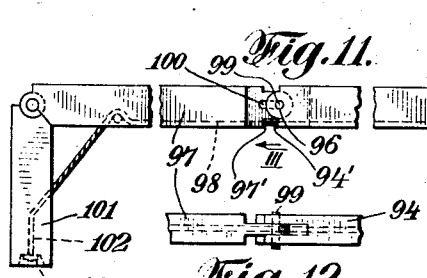
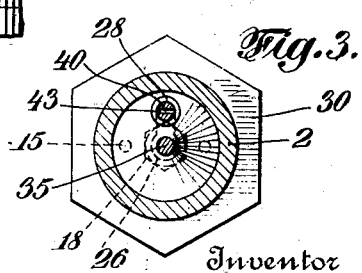
Inventor
George Zitzmann.
By his Attorney Sept. 11, 1928.
G. ZITZMANN
1,683,710
ENGINE TESTING GAUGE
Filed June 3, 1921   2 Sheets-Sheet 2
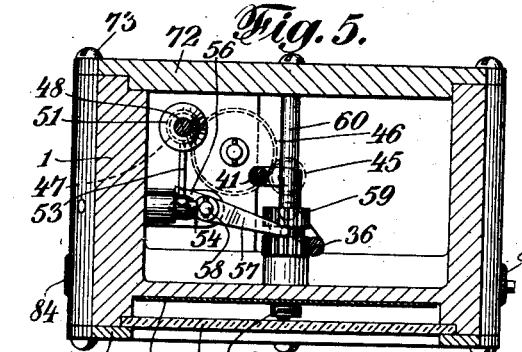
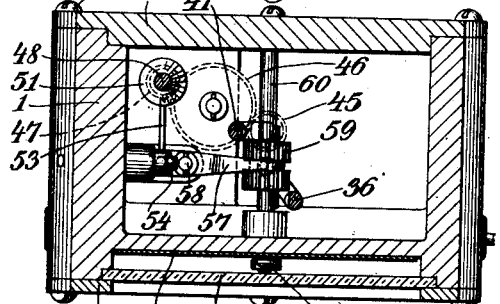
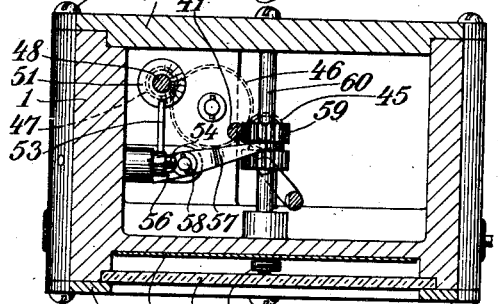
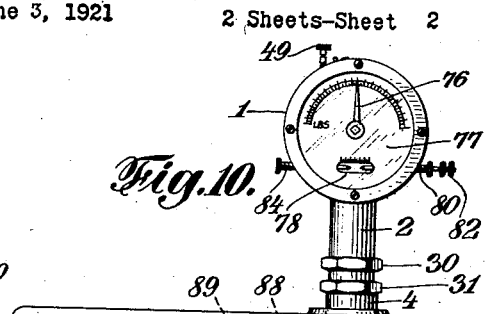
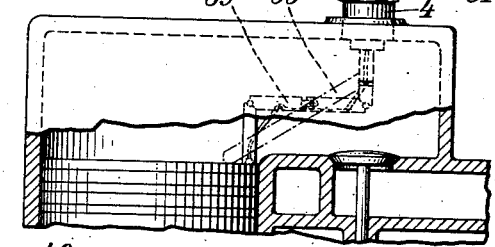
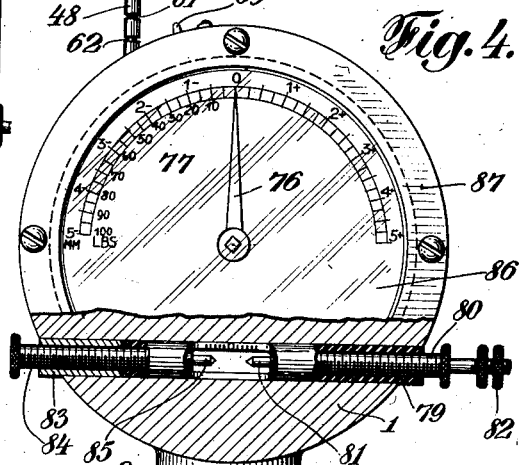
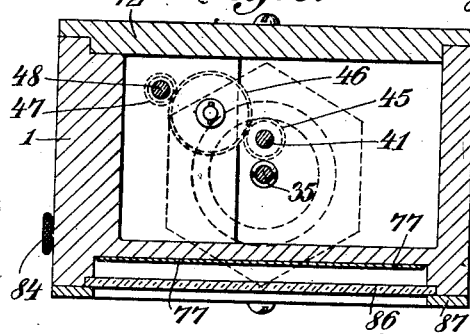
Inventor
George Zitzmann.
By his Attorney Patented Sept. 11, 1928.

1,683,710

UNITED STATES PATENT OFFICE.

GEORGE ZITZMANN, OF NEW YORK, N. Y., ASSIGNOR TO AUTOMATIC MOTOR CONTROL CORPORATION.

ENGINE-TESTING GAUGE.

Application filed June 3, 1921. Serial No. 474,671.

This invention relates to engine testing gauges.

The primary object of my invention is to provide a device for timing and testing the spark of an engine and for testing the compression thereof as well as indicating the position of the piston.

Further objects of my invention will be more fully apparent from the following description and the accompanying drawings, forming part of the specification, in which:

Fig. 1 is a vertical cross sectional view through a preferred form of my device taken on line 1—1 of Fig. 2.

Fig. 2 is a cross sectional view taken on line 2—2 of Fig. 1.

Fig. 3 is a cross sectional view taken on line 3—3 of Fig. 1.

Fig. 4 is a front elevation, partially in section, of the upper part of my device.

Figs. 5, 6, and 7 are cross sectional views taken on line 5—5 of Fig. 1, showing parts of my device in various positions.

Fig. 8 is a cross sectional view taken on line 8—8 of Fig. 1.

Fig. 9 is a top view of my device.

Fig. 10 is a front elevation of my device attached to an engine cylinder.

Figs. 11 and 12 are detail views of a modified form of a contacting rod adapted to be passed into an engine cylinder from the valve chamber.

Referring to the drawings, numeral 1 indicates a housing, having a depending extension 2 provided with an internal thread indicated at 3, which is adapted to engage a closing or attaching member 4. The latter is adapted to be placed in an opening of the engine head and its lower portion is preferably externally threaded as shown at 5, so as to allow my device to be temporarily associated with an engine cylinder at the spark plug opening.

The attaching member 4 is provided with an internal thread 6 for receiving a closing nut 7, which is perforated at 8 and recessed at 9, which recessed portion forms a seat for a washer 10 which is secured at 11 to the contacting rod 12 which passes through a central aperture of the closing nut 7.

This contacting rod is preferably drilled as indicated at 13 and is guided at the upper portion 14 of the attaching member 4. This upper portion is also perforated as indicated at 15 to permit free communication between the compression chamber of the engine and the interior of the depending housing extension 2. Contacting rod 12 is held in downward position by means of expansion spring 12' bearing against the upper portion 14 of attaching member 4 and washer 10 attached to the rod.

At the lower end of the contacting rod, an adjustable and exchangeable contact member 16 is provided, while the upper portion of the contacting rod which protrudes into the housing extension is equipped with an adjustable contacting point 17, adapted to be locked into position by the lock nut 18. The contacting point is also preferably drilled as indicated at 19, and the thus formed channel terminates at 20.

The holes 10 and 19 are so arranged as to receive a cord or wire which may be clamped in place by a set screw 21. Slidably guided within the depending extension 2 of the housing is a piston 22, preferably equipped with a conical head 22'. Depending from the latter into the hollow of the piston is a boss 23 provided with a bushing 24, in which is air-tightly guided a connecting member 25. The latter is enlarged at 26 and this enlargement serves as abutment for contact point 17 of rod 12.

The guided portion 27 of the connecting member passes through the bushing 24, and has at its upper end a disk-like enlargement 28. Between the bushing 24 and the enlargement 28 is arranged an expansion spring 29, adapted to keep the connecting member normally in the position shown in Fig. 2.

The lower portion of the depending extension and the upper portion of the attaching member are preferably designed to form nuts as indicated at 30 and 31, respectively. The upper portion of the housing contains the operating mechanism for indicating the compression and the position of the piston. The bottom portion of the housing, indicated at 32, is drilled in two places 33 and 34. Through the aperture 33 passes the lower end 35 of a gear rack 36 which is guided in that aperture and in a bushing 37. The rack is kept in balanced or zero position by means of springs 38 and 39.

Through the other aperture 34 of the housing, passes the lower portion 40 of an adjustable gear rack 41, disposed opposite to gear rack 36 and guided at its upper portion in a bushing 37', and also balanced by a spring indicated at 38'. The lower portion of the gear rack is adjustable by means of a left and right hand threaded bushing 42, connecting the left and right hand threaded rack portions 40' and 40.

The latter rack portion is slotted as indicated at 43, in which slot a pin 44 is arranged for preventing rack end 40 from turning while the internally threaded bushing 42 is being operated.

Bushing 42 possesses a geared outer face 45 meshing with the intermediate gear 46, which again meshes with the gear 47. The latter may be turned in either direction by means of an adjusting pin 48, operable from without the housing by means of a knurled head 49.

The lower portion 50 of the adjusting pin is preferably so arranged as to engage gear 47 while permitting a sliding movement within the gear when the pin is set at different heights. In this manner the gear 47 will always be rotated when the pin is turned.

At about the center of the pin, a double cone 51 is arranged against which presses a spring 52. The cone when shifted in downward or upward direction operates a bell crank 53 pivoted at 54, the depending portion 55 of which engages the fork end 56 of a shift lever 57 pivoted at 58. This shift lever engages gear 59 slidably mounted upon and keyed to the indicator shaft 60 which passes through the center of the housing.

The spring 52 tends to keep cone 51 and therefore the pin in downward position, in which case the gear is shifted into engagement with gear rack 41, as shown in Fig. 6.

By means of notches 61, 62, and 63 provided at the upper portion of the pin and adapted to be engaged by a snap spring 64, the position of the spring may be changed, and the pin then remains in any of the three desired positions.

When in the position indicated in Fig. 1, where spring 64 engages notch 63, the gear is shifted into engagement with gear rack 36 as shown in Fig. 5. When spring 64 engages notch 62, that is, when the pin 48 is in central position, the gear 59 is in neutral position—that is, it is not in engagement with either of the racks.

The lower portion of the pin is guided in a bushing 65, while the upper portion of the pin is guided in a bushing 66, which is rotatably lodged in a cutout portion of the housing. The pin 48 is grooved at 48' and the groove engages a key 48" permanently set into bushing 66.

The protruding part of bushing 66 is engaged by a notched gear member 67, the notches of which are engaged by a spring operated catch lever 68, which is pressed into one of the notches. By swinging the upturned arm 69 of the catch lever 68 in the direction of the arrow II to the position shown in broken lines, the lever leaves the notched member 67, thus permitting rod 48 to be turned either in clockwise or anti-clockwise direction, by means of which the gear 47 and therethrough the bushing 45 is operated, whereby the gear rack 41 and particularly its lower extension 40 is adjusted, relative to the disk 28 of connecting member 25 slidably arranged within piston 22.

The indicator shaft 60 is rotatably mounted at one end in the bearing 70 provided in the housing, while its other end is lodged at 71 at the center of the closing plate 72, which is attached to the housing by any suitable means indicated at 73.

The center portion of cover 72 is recessed as indicated at 74 for receiving a balancing spring 75, which is attached at one end to cover 72 and at its central end to shaft 60. This spring is so arranged as to cause indicator 76 permanently attached to shaft 60 at the outer face of the housing, to normally assume a zero or neutral position.

Below that indicator there is a dial 77 arranged at the outer face of the housing, and is equipped with two gradations, one serving for indicating the compression, the other for reading the position of the piston, as clearly seen in Figs. 4 and 10, where the left hand portion of the gradation indicates pounds of pressure and millimeters, while the right hand portion indicates millimeters only.

Below the center of the dial, there is provided a cut-out portion or window 78 at the top end of which is a scale for measuring the length of the spark. Beneath this cut-out dial portion, there is a spark gauge associated with the housing which comprises a tubular insulated member 79 which is internally threaded and adapted to receive an adjustable screw 80, provided at one end with a reduced and pointed end 81. At the other end of the screw 80 there is an arrangement indicated at 82 for attaching a cable from the magneto of an engine.

Oppositely disposed to the insulator tube 79 there is an internally threaded conductive tube 83 provided, adapted to receive another adjustable screw 84 which is also equipped with a reduced pointed portion 85, as clearly shown in Fig. 4.

By reducing or enlarging the distance between the pin points 81 and 85, the spark or gap may be readily measured.

The dial and the indicator are preferably covered with a glass 86 held in place in any convenient manner indicated at 87.

When my apparatus is to be used in connection with an engine which does not possess an aperture in its cylinder head so arranged as to permit direct access to the cylinder piston, but where for instance an aperture is provided in the valve chamber as shown in Fig. 10, the lower contacting member 16 of the contacting rod 12 is removed and replaced by either a bent member indicated at 88 in Fig. 10, or by a linked arrangement indicated at 89 and shown in detail in a preferred form in Figs. 11 and 12. Such link member is composed of several parts so arranged as to permit the insertion thereof through the valve chamber into the compression chamber and above the engine piston.

Referring to the preferred forms shown in Fig. 11, there is provided an attaching member 90 reduced at 91 to fit into the threaded lower portion of contacting rod 12. The reduced portion is centrally drilled for receiving a cord 92 which passes out from member 90 at 93 and through attaching member 94, which is hinged at 95 to member 90. These members 90 and 94 are so arranged as to permit the latter to swing downward when cord 92 is loose. When the cord is pulled, however, the members 90 and 94 are set at a right angle to each other in which position they are held when indicating the position of the engine piston.

Member 94 is further hinged at its other end at 96 to another member or members 97. The hinged portion between members 94 and 97 is so arranged as to provide for the movement of the hinged portion in downward direction when cord 92, which passes in a groove or channel 98, is loose.

The moment the cord is tightened, pin 99 slidably mounted in slot 100 moves in the direction of arrow III whereby the lower edges 94' and 97' of members 94 and 97 are caused to abut, thereby preventing any movement to take place between the two links. Hingedly connected to member 97 is another depending member 101.

The hinged portions of members 97 and 101 are similarly arranged as are the hinged portions of members 94 and 97, permitting movement in one direction when cord 92 is loose, while causing these members 97 and 101 to form a right angle, when cord 92 is pulled taut.

The cord passes from the groove or channel 98 from within member 97 into member 101, the free end of which is centrally bored as indicated at 102, through which bore cord 92 is passed. The end of cord 92 is immovable associated with member 101, in a socket indicated at 103.

When the link member is attached to contacting rod 12, cord 92 passes through channel 13 of the rod, through channel 19 of the upper contact point 17, and out at the end 20 of passage 19. By means of set screw 21, the cord may be held in its stretched position keeping the links in rigid arrangement so as to transmit the motion of the engine piston to the contacting rod.

*Operation.*

When my device is to be used for testing an engine as to its compression or proper timing, the spark plug is removed from one of the engine cylinders and my device inserted. The attaching member 4 is preferably associated with the cylinder without the upper housing being attached thereto. The engine is then turned by hand and the extent of movement imparted to rod 12 by the piston is noted. The contacting point 17 is then adjusted so that at the highest point in its movement it will be approximately at a desired point above the attaching member 4.

This rough adjustment becomes imperative, because of the fact that each engine is built differently and the distance between the uppermost position of the piston and the head of the cylinder varies considerably. It is important that point 17 move far enough to actuate the indicator, but not so far as to jamb the mechanism.

Having thus roughly adjusted the contacting rod, the housing is attached to the attaching member. The engine is again turned by hand so that the engine cylinder comes to its uppermost position, which position may be read through the movement of indicator 76, over the dial.

The indicator is operated in the following way: The contacting rod 12 abuts with the enlarged portion 26 of connecting member 25, the upper enlarged portion 28 of which contacts with the lower leg 40 of gear rack 41.

The gear 59 having been shifted into engagement with gear rack 41 in the manner explained previously transmits the motion of the gear rack to indicator shaft 60, to which indicator 76 is permanently attached.

Now it becomes necessary to set the indicator to a point indicating the position of the piston when the spark should occur. This fine adjustment is accomplished by releasing the notch member 67 so as to permit the rotation of adjusting pin 48. To this end lever extension 69 is swung in the direction of arrow II, thus disengaging locking lever 68 from the notch member 67.

Now the knurled disk 49 may be rotated whereby pin 48 is also turned and causes the rotation of gears 46 and 47 and the geared sleeve 45. In this manner the position of the gear rack 41 and lower extension 40 is adjusted until indicator 76 reaches the point indicated at 1+ on the dial, while the engine piston is at its uppermost position indicated in broken lines at IV.

Now the cable formerly attached to the spark plug is secured at 82 to the spark gauge of my device, which portion is insulated while the adjusting screw 84 is grounded with the engine.

When the engine is now turned and the piston moves from its uppermost position about 1 mm. below that position, the spark should occur between the points 81 and 85 of the spark gauge, with the spark lever in retarded position.

Contacting rod 12 moves downwards together with the piston whereby the indicator is caused to move to the zero point at which moment the spark is to take place.

When the spark occurs at any later moment, which may be easily read at the left or "minus" portion of the upper scale of the dial when the indicator moves in anti-clockwise direction, the timing of the engine is incorrect, it becomes necessary to remember the position of the piston indicated by indicator 76 when the late spark occurs, and the magneto is then adjusted until the spark is advanced so that it takes place exactly at the moment when the indicator 76 is at zero.

In order to test the compression within the engine, the adjusting pin 48 is brought into its uppermost position so that notch 63 is engaged by spring member 64. By moving the pin to this position the gear 59 is shifted into engagement with gear rack 36 and out of engagement with gear rack 41. Due to the balancing springs 38 and 39 gear rack 36 is held in balanced position and due to the balancing spring 75 the indicator is held in zero position.

The piston 22 slidably mounted in the depending extension 2 of the housing abuts with its upper point in contact with the lower leg 35 of gear rack 36. When the engine is now turned by hand so as to produce compression in the engine, piston 22 moves upwards and pushes gear rack 36 also upwards, whereby indicator 76 is caused to move in anti-clockwise direction, indicating the pressure upon the lower scale of dial.

In order to prevent any escape of gases between the attaching member 4 and the depending extension 2 of the housing, a tightening gasket 4' is provided between the abutting faces of the two members.

While I have shown in my drawings preferred forms of my invention, be it understood that various changes may be made in the construction and design of my device and that improvements may be made thereon, in order to facilitate the association of my device to any kind of engine now in use.

I therefore reserve for myself the right to make such improvements, changes and modifications in order to meet the various conditions arising from the manifold uses to which my device may be employed.

Having thus described my invention, I claim:—

1. In an engine tester, a housing adapted to be temporarily secured in open communication with a cylinder of an engine, a movable indicator therein, a plurality of independent members within the housing for actuating the indicator, compression actuated means for actuating one of said members, piston actuated means for actuating the other of said members, optional means to couple either of said members with the indicator.

2. In an engine tester, a housing having a lower tubular portion, a shaft within the housing, an indicator on said shaft, a plurality of independent members within the housing for actuating the indicator, said members projecting into the upper part of the tubular portion, compression actuated means within the tubular portion and operatively associated with one of said members, piston actuated means slidably mounted in said tubular portion and operatively associated with the other of said members, optional means to couple either of said members with the indictor shaft.

3. In an engine tester, a housing having a lower tubular portion, a shaft within the housing, an indicator on said shaft, a pair of members slidably mounted within the housing and extending into operable association with the shaft therein, the lower ends of said members projecting into the upper part of said tubular portion, compression actuated means associated with one of said slidable members, piston actuated means associated with the other of said slidable members, optional means to couple either of said slidable members with the indicator shaft and a spark gap visibly mounted in said housing.

4. In an engine tester, a housing, a dial, an indicator co-operating with said dial, pressure controlled means actuated by the compression of the engine, piston controlled means actuated by the engine piston, a manually operated member to selectively engage either of said means with the indicator.

5. In an engine tester, a housing, a dial, an indicator co-operating with said dial, a pressure controlled member and a piston controlled member adapted to independently co-operate with the indicator, and adjustable motion transmitting element associated with the indicator to couple either the compression or the piston controlled member to the indicator to indicate respectively the stage of compression or the position of the piston within the engine cylinder, and a spark gap visibly mounted on the housing.

6. In an engine tester, a housing having a lower tubular portion, a pair of gear racks slidably mounted therein each having a portion projecting into the upper part of said tubular portion, a shaft, an indicator thereon, a gear slidably but non-rotatably positioned on said shaft to engage either of said racks, manual means for sliding said gear, a piston slidable in said tubular portion and adapted to contact one of said racks, means associating said tubular portion with an engine cylinder whereby the piston is actuated by compression in the cylinder, a rod slidably mounted in said last-named means, a member slidably carried by said piston and adapted to transmit motion from said rod to the other of said racks whereby the pressure, or the position of the piston within the engine cylinder may be alternately and selectively indicated, and a spark gap visibly mounted in said housing.

7. In an engine tester, a dial, an indicator co-operating with said dial, a pair of reciprocatory members mounted within the housing and extending into operative association with the indicator, means to selectively engage the indicator with either of said reciprocatory members, pressure actuated means for moving one of said members, piston actuated means for moving the other of said members.

8. In an engine tester, a housing adapted to be screwed into an opening of an engine cylinder, a rod mounted in said housing for rotary and reciprocating movement, and an angularly extending actuating arm connected with said rod.

9. In an engine tester, a housing adapted to be secured in an opening of an engine cylinder, a rod mounted in said housing for reciprocating movement, indicating means actuated by movement of said rod, and means for effecting a longitudinal lengthening of the rod for bringing the movement of the rod within the indicating range of the indicator said adjusting means being accessible from the exterior of said cylinder while said rod remains in said opening.

10. In an engine tester, a housing adapted to be secured in an opening of an engine cylinder, a rod mounted in said housing for reciprocating movement, indicating means actuated by movement of said rod, means in said housing providing a rough adjustment for bringing the movement of the rod within the indicating range of the indicator, and means carried by said housing providing for a fine adjustment for setting the indicator to correspond to a definite point in the movement of the rod.

11. In an engine tester, a housing forming a hand tool and adapted to be secured in an opening of an engine cylinder, means in said housing for indicating the position of the piston in said cylinder piston-actuated means in said housing for moving said indicating means, and a spark gap visibly mounted in said housing.

12. In an engine tester, a housing forming a hand tool and adapted to be secured in an opening of an engine cylinder, means in said housing for indicating the compression in said cylinder and a spark gap visibly mounted in said housing.

13. In an engine tester adapted for temporary securement to an engine cylinder in an offset position relative to the piston therein, an actuating rod within the tester, a multi-linked member connected with said rod and adapted to extend to a point in the cylinder above the engine piston, releasable means for rigidly maintaining the multi-linked member in its extended position to transmit motion from the engine piston to said actuating rod.

14. In an engine tester adapted for temporary securement to an engine cylinder in an offset position relative to the piston therein, an actuating rod within the tester, a contacting member adapted to be associated with said actuated rod and comprising a plurality of links adapted to freely pass through an offset aperture in the cylinder and to extend to a point in the cylinder above the engine piston, and means for rigidly locking said links in extended position.

15. An engine testing instrument comprising a threaded member adapted to be secured in an opening of an engine cylinder, a dial housing connected to the threaded member, a dial plate in said dial housing, a pointer moving over the dial plate, means actuated by the engine piston and adapted to move the pointer, and a pair of electrodes mounted on the dial housing, one of the electrodes being insulated from the housing and having its outer end extending beyond the dial housing for cooperation with an ignition wire, the inner ends of the electrodes being visible from in front of the dial plate.

16. An engine testing instrument comprising a threaded member adapted to be secured in an opening of an engine cylinder, a dial housing connected to the threaded member, a dial plate in said dial housing, a pointer moving over the dial plate, means actuated by the engine piston and adapted to move the pointer, and a pair of electrodes mounted on the dial housing, one of the electrodes being adjustable and insulated from the housing and having its outer end extending beyond the dial housing for cooperation with an ignition wire, the inner ends of the electrodes being located opposite a scale on the face of the dial plate.

17. An engine testing instrument comprising a threaded member adapted to be secured in an opening of an engine cylinder, a rod mounted in said threaded member for rotary and reciprocating movement, an offset arm carried by the rod and adapted for contact with the piston of the engine, and indicating means mounted on the instrument for rendering visual the vertical movement of the rod.

18. An engine testing instrument comprising a member adapted for attachment in an opening of an engine cylinder, indicating means carried by the member, and operating means cooperating with the indicating means, said operating means comprising pressure actuated means and piston operated means.

19. An engine testing instrument comprising a tubular member adapted for attachment in an opening of an engine cylinder, indicating means carried by the member, and operating means cooperating with the indicating means, said operating means comprising a pressure actuated piston within the tubular member, and a rod slidably mounted within the tubular member and adapted to be operated by the piston of the engine.

20. An engine testing instrument comprising a housing adapted for attachment in an opening of an engine cylinder, a scale mounted in the housing, a pointer moving over the scale, a piston mounted in the housing and adapted to be operated by pressure entering the lower end of the housing from the cylinder, means cooperating with the piston for moving the pointer, a rod slidably mounted within the housing and adapted to be operated by the piston of the engine, and means cooperating with the rod for moving the pointer.

21. In an engine gauge, a housing adapted for attachment in an opening of an engine cylinder, indicating means carried by said housing, an operating member within the housing and operatively connected with said indicating means, pressure-operated means for moving said operating member, and piston-operated means for moving said operating member.

22. In an engine gauge, a housing adapted for attachment in an opening of an engine cylinder, a scale carried by the housing, a pointer cooperating with said scale, an operating member carried by the housing and operatively connected with said indicating means, and operating means cooperating with said operating member, said operating means comprising pressure-actuated means mounted within the housing and piston-actuated means mounted within the housing.

Signed at New York, in the county of New York and State of New York, this 27 day of May, A. D. 1921.

GEORGE ZITZMANN.